No. 609,696. Patented Aug. 23, 1898.
P. NICOLLE.
VALISE SEAT AND LUNCH VESSEL.
(Application filed Oct. 23, 1895.)
(No Model.)
Fig. 1.
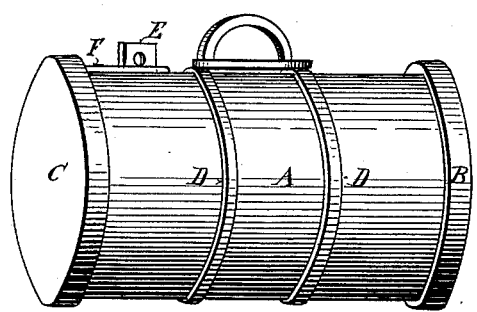
Fig. 2.
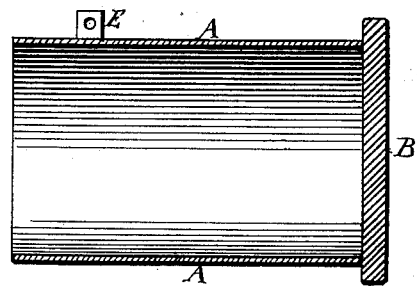
Fig. 3.
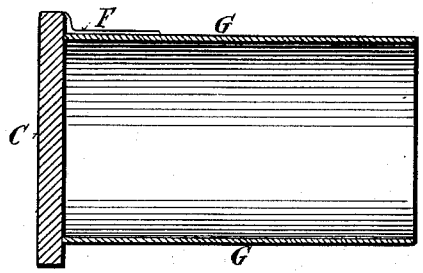
Fig. 4.
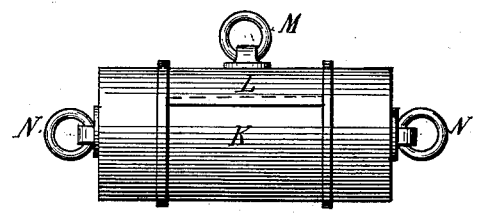
Fig. 6.
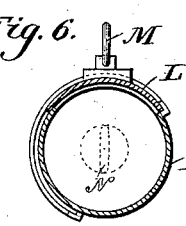
Fig. 5.
Fig. 7.
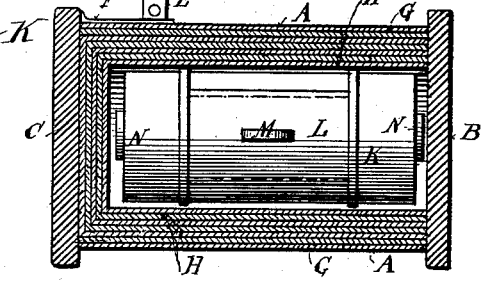
Witnesses.
Frederick James Bird.
Thomas Butler.
Inventor.
Philip Nicolle
THE NORRIS PETERS CO., PHOTO-LITHO., WASHINGTON, D. C.

UNITED STATES PATENT OFFICE.

PHILIP NICOLLE, OF TORONTO, CANADA.

VALISE-SEAT AND LUNCH VESSEL.

SPECIFICATION forming part of Letters Patent No. 609,696, dated August 23, 1898.

Application filed October 23, 1895. Serial No. 566,652. (No model.) Patented in Canada April 20, 1896, No. 52,003.

*To all whom it may concern:*

Be it known that I, PHILIP NICOLLE, a citizen of the Dominion of Canada, residing at the city of Toronto, in the county of York and Province of Ontario, Canada, have invented a new and useful Valise-Seat and Lunch Vessel, (for which I have received a patent in Canada, dated April 20, 1896, No. 52,003,) of which the following is a specification.

My invention relates to improvements in valise-seats and lunch vessels; and the objects of my improvements are—

First. To provide a cylindrical valise containing a number of cylindrical seats and a lunch vessel.

Second. This valise is constructed of a cylindrical shell open at one end and having a seat fixed to the other end. Inside this shell a smaller one is fitted to slide in and out. The smaller shell will also be open at one end and have a seat fixed at the other end.

Third. This valise is not intended to be used altogether as a traveling-bag, but to be carried at picnics and seaside or other pleasure resorts, where it can be taken apart and the cylinders stood on end and occupied as seats.

Fourth. The two outer shells when closed together can contain inside them a number (5) of smaller shells, each fitting into each other. This lunch vessel will be made of tin and water-tight and of such a size as to slide and fit into the smallest shell. The lunch vessel will have a sliding door on the top, with a ring. This door is to be used for admission of lunch, &c. There will be rings at each end of lunch vessel to withdraw same from inner shell. The lunch vessel stood on end can be used as a seat.

Fifth. The outside shell of all and seat and inner outside shell and seat can be covered with waterproof cloth, or the whole of the shells can be made of sole-leather or other light material.

Sixth. The outside shell of all will be encircled with a leather strap and hand-strap to carry valise. The outside shell and seat on inner outside shell will be secured to each other by stud and strap and padlock or pin, the whole—namely, lunch vessel and shells—being inclosed, forming a portable valise.

I attain these objects by the mechanism illustrated in the accompanying drawings, in which—

Figure 1 is a perspective view of valise closed complete. Fig. 2 is a sectional view of outside shell and seat. Fig. 3 is a sectional view of inner outside shell and seat to slide into outer outside shell shown in Fig. 2. Fig. 4 is an outside view of lunch vessel, with sliding door and top and end rings. Fig. 5 is a sectional plan of outer and inner outside shells, five smaller inner shells, and outside view of lunch vessel, in which position they would be when put together and valise closed. Fig. 6 is a cross-section, and Fig. 7 is a longitudinal section, of lunch vessel shown in Fig. 4 of drawings.

Similar letters refer to similar parts throughout the several views.

A is the outside shell, into which the inner outside shell G, five smaller shells H, and lunch vessel K fit and are inclosed.

K is the lunch vessel, with sliding door L on top and ring M to open or close sliding door L.

N are rings at each end of lunch vessel K to withdraw lunch vessel K from shell H.

B is the seat attached to end of outside shell A.

C is the seat attached to end of inner outside shell G.

F is the strap, attached to seat C of inner outside shell G, and E is a stud attached to outer outside shell A and for the securing of strap F to stud E on outside shell A by padlock or pin. The outer outside shell A and the inner outside shell G, inner shells H, and lunch vessel K are thus held securely.

D is the encircling strap and hand-strap to carry valise.

I am aware that prior to my invention cylindrical valises and other traveling bags and boxes have been made with straps, &c. I therefore do not claim such combination broadly; but What I do claim as my invention, and desire to secure by Letters Patent, is—

The combination in a valise-seat and lunch vessel, the outside shell A its fixed seat B at one end and the inner outside shell G its fixed seat C at one end sliding in and out of said outside shell, the said inner outside shell and the smaller shells H each with fixed seat at one end and each fitted into each other sliding in and out of said inner outside shell, the smallest shell H and lunch vessel K its sliding door L and ring M on top and the rings N sliding in and out of said smallest shell, whereby when the lunch vessel is taken out of smallest shell and the smaller shells taken out of inner outside shell and inner outside shell taken out of outside shell they can all be stood on end and occupied as seats and when put back in their respective places and secured and encircled by straps form a portable valise, substantially as described.

PHILIP NICOLLE.

Witnesses:
FREDERICK JAMES BIRD,
ALVIN G. WHITE.